US012743461B2

(12) United States Patent
Jin et al.

(10) Patent No.: US 12,743,461 B2
(45) Date of Patent: Sep. 22, 2026

(54) CONTENT GENERATION METHOD BASED ON MULTIMEDIA CONTENT, DEVICE AND MEDIUM

(71) Applicant: Beijing Zitiao Network Technology Co., Ltd., Beijing (CN)

(72) Inventors: Shixing Jin, Beijing (CN); Ran Zhang, Beijing (CN); Zhengxing Li, Beijing (CN); Leiqi Yao, Beijing (CN); Aonan Tan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/793,748

(22) Filed: Aug. 2, 2024

(65) Prior Publication Data

US 2025/0053590 A1 Feb. 13, 2025

(30) Foreign Application Priority Data

Aug. 8, 2023 (CN) ......................... 202310997018.2

(51) Int. Cl.
*G06F 16/00* (2019.01)
*G06F 16/22* (2019.01)
(Continued)

(52) U.S. Cl.
CPC ........ *G06F 16/435* (2019.01); *G06F 16/2237* (2019.01); *G06F 40/205* (2020.01); *G06F 40/35* (2020.01)

(58) Field of Classification Search
CPC .. G06F 16/24575; G06F 16/36; G06F 16/951; G06F 16/9538; G06F 16/43;
(Continued)

(56) References Cited

U.S. PATENT DOCUMENTS 11,960,844 B2 * 4/2024 Galitsky ............... G06F 40/253
12,099,537 B2 * 9/2024 Bae ..................... G06F 16/3344
(Continued)

FOREIGN PATENT DOCUMENTS

CN 103729422 A 4/2014
CN 106096050 A 11/2016
(Continued)

OTHER PUBLICATIONS

China Patent Application No. 202310997018.2; Office Action; dated Dec. 8, 2025; 15 pages.

*Primary Examiner* — Yicun Wu
(74) *Attorney, Agent, or Firm* — BakerHostetler

(57) ABSTRACT

The present disclosure provides a content generation method, a computer device, and a storage medium; and the method includes: parsing a multimedia content, which is acquired, to obtain multiple pieces of content text information; storing the content text information into a vector database in a vector data form according to a text association degree between the content text information, wherein vector data in the vector database have an index relationship related to the text association degree; in response to receiving question information which is input, querying target vector data matching the question information from the vector database based on the index relationship between the vector data in the vector database; and inputting target content text information corresponding to the target vector data and the question information into an artificial intelligence model to obtain an answer result associated with the multimedia content.

20 Claims, 5 Drawing Sheets

(51) Int. Cl.

| | |
|---|---|
| ***G06F 16/435*** | (2019.01) |
| ***G06F 40/205*** | (2020.01) |
| ***G06F 40/35*** | (2020.01) |

(58) Field of Classification Search

CPC ........ G06F 16/285; G06N 5/022; G06N 5/00; G06N 5/046; G06N 3/02; G06Q 10/063114; G06Q 30/016; G06Q 10/10; H04L 12/1822; H04L 51/04

See application file for complete search history.

(56) References Cited

U.S. PATENT DOCUMENTS

| | | | | |
|---|---|---|---|---|
| 2015/0370859 | A1 | 12/2015 | Bakir et al. | |
| 2016/0247068 | A1* | 8/2016 | Lin | G06F 40/40 |
| 2018/0075111 | A1* | 3/2018 | Bakir | G06F 16/43 |
| 2019/0057143 | A1* | 2/2019 | Porter | G06F 16/285 |
| 2022/0154935 | A1* | 5/2022 | Paller | F24C 11/00 |
| 2024/0386210 | A1* | 11/2024 | Yoo | G06F 40/30 |

FOREIGN PATENT DOCUMENTS

| | | | |
|---|---|---|---|
| CN | 112395385 | A | 2/2021 |
| CN | 112990142 | A | 6/2021 |
| CN | 113220832 | A | 8/2021 |
| CN | 115203445 | A | 10/2022 |
| JP | 2011-008334 | A | 1/2011 |

* cited by examiner

CONTENT GENERATION METHOD BASED ON MULTIMEDIA CONTENT, DEVICE AND MEDIUM

CROSS-REFERENCE TO RELATED APPLICATION

The present application claims priority of Chinese Patent Application No. 202310997018.2, filed on Aug. 8, 2023, and the entire content disclosed by the Chinese patent application is incorporated herein by reference as part of the present application for all purposes under the U.S. law.

TECHNICAL FIELD

The present disclosure relates to the technical field of computers, and specifically relates to a content generation method and apparatus based on a multimedia content, a device and a medium.

BACKGROUND

With the rapid development of artificial intelligence technology, a variety of artificial intelligence models have begun to be widely used, and they are playing an increasingly important role in various fields.

SUMMARY

At least one embodiment of the present disclosure provides a content generation method based on a multimedia content, which comprises:

parsing a multimedia content, which is acquired, to obtain multiple pieces of content text information;

storing the content text information into a vector database in a vector data form according to a text association degree between the content text information, wherein vector data in the vector database have an index relationship related to the text association degree;

in response to receiving question information which is input, querying target vector data matching the question information from the vector database based on the index relationship between the vector data in the vector database; and inputting target content text information corresponding to the target vector data and the question information into an artificial intelligence model to obtain an answer result associated with the multimedia content.

For example, in the method provided by the at least one of embodiment of the present disclosure, after obtaining the multiple pieces of content text information, the method further comprises:

inputting the multiple pieces of content text information into the artificial intelligence model to obtain abstract report information corresponding to the multimedia content; and transmitting the abstract report information to a client, wherein the client is configured to display the abstract report information after receiving the abstract report information.

For example, in the method provided by the at least one of embodiment of the present disclosure, the querying target vector data matching the question information from the vector database based on the index relationship between the vector data in the vector database comprises:

generating at least one target query term corresponding to the question information according to semantic features of the question information, wherein different target query terms have different search semantics; and determining the target vector data matching the question information according to each target query term and the index relationship between the vector data in the vector database.

For example, in the method provided by the at least one of embodiment of the present disclosure, the inputting target content text information corresponding to the target vector data and the question information into an artificial intelligence model to obtain an answer result associated with the multimedia content comprises:

inputting the target content text information and the question information into the artificial intelligence model, and generating the answer result associated with the multimedia content through the artificial intelligence model according to corresponding content generation rule information.

For example, in the method provided by the at least one of embodiment of the present disclosure, the inputting target content text information corresponding to the target vector data and the question information into an artificial intelligence model to obtain an answer result associated with the multimedia content comprises:

acquiring each round of historical dialog information with dialog time before question time of the question information, wherein the historical dialog information is dialog information for the multimedia content; and inputting each round of historical dialog information, the target content text information and the question information into the artificial intelligence model to obtain the answer result associated with the multimedia content.

For example, in the method provided by the at least one of embodiment of the present disclosure, the multimedia content comprises at least one selected from the groups of text content in any text format and video content in any video format;

the multimedia content is acquired by at least one of the following modes:

acquiring local text content or local video content uploaded by a client, and acquiring the text content or the video content from a storage location corresponding to an uploaded content link.

For example, in the method provided by the at least one of embodiment of the present disclosure, upon the multimedia content comprising the video content, the content text information comprises image text information corresponding to each frame of video frame image; and the inputting the multiple pieces of content text information into the artificial intelligence model to obtain abstract report information corresponding to the multimedia content comprises:

inputting each piece of image text information into the artificial intelligence model to obtain key frame information of the video content, keyword information and video content summary information;

determining each key frame image corresponding to the video content according to the key frame information; and generating the abstract report information corresponding to the video content according to the key frame image, the keyword information and the video content summary information.

At least one embodiment of the present disclosure also provides a content generation apparatus based on a multimedia content, which comprises:

- a parsing module, configured to parse a multimedia content, which is acquired, to obtain multiple pieces of content text information;
- a storage module, configured to store the content text information into a vector database in a vector data form according to a text association degree between the content text information, wherein vector data in the vector database have an index relationship related to the text association degree;
- a query module, configured to in response to receiving question information which is input, query target vector data matching the question information from the vector database based on the index relationship between the vector data in the vector database; and
- an output module, configured to input target content text information corresponding to the target vector data and the question information into an artificial intelligence model to obtain an answer result associated with the multimedia content.

At least one embodiment of the present disclosure also provides a computer device, which comprises: a processor and a memory, wherein the memory stores computer-readable instructions executable by the processor; the processor is configured to execute the computer-readable instructions stored in the memory; and when the computer-readable instructions are executed by the processor, the processor executes the content generation method based on the multimedia content provided by any embodiment of the present disclosure.

At least one embodiment of the present disclosure also provides a non-transient computer-readable storage medium, storing computer programs, when the computer programs are operated by a computer device, the computer device executes the content generation method based on the multimedia content provided by any embodiment of the present disclosure.

BRIEF DESCRIPTION OF DRAWINGS

In order to more clearly illustrate the technical solutions of the embodiments of the present disclosure, the following is a brief introduction to the accompanying drawings required for use in the embodiments. The accompanying drawings herein are incorporated into the specification and constitute a part of the specification. These accompanying drawings illustrate embodiments consistent with the present disclosure and are used together with the specification to illustrate the technical solutions of the present disclosure. It is to be understood that the following accompanying drawings only illustrate certain embodiments of the present disclosure and should not be regarded as limiting the scope. For ordinary technicians in this field, other relevant drawings can also be obtained based on these drawings without creative work.

DETAILED DESCRIPTION

Figure 1:
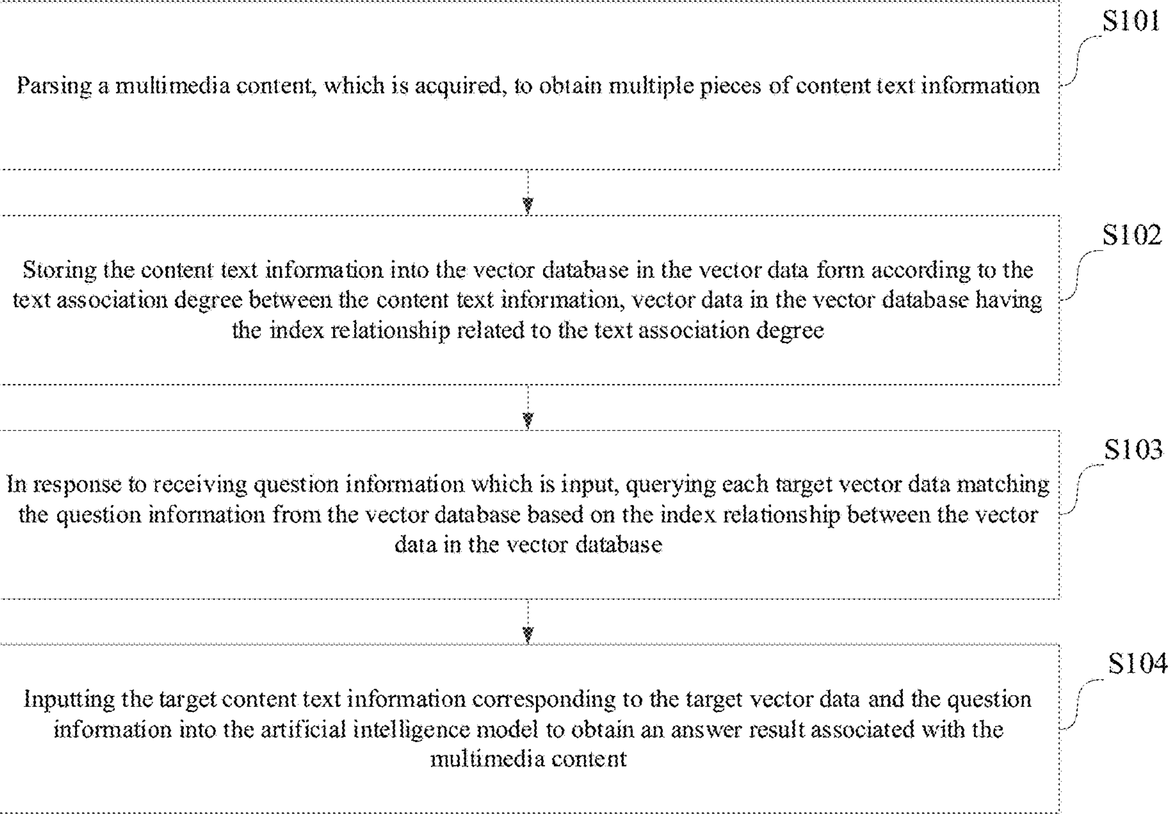
FIG. 1 shows a flowchart of a content generation method based on a multimedia content according to an embodiment of the present disclosure.

In order to make objects, technical solutions and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The "multiple or several" herein refers to two or more. "And/or" refers to an association relationship of related objects, indicating that there may be three relationships, for example, A and/or B can represent: there is only A, there are both A and B, and there is only B. The character "/" generally indicates that the objects associated before and after are in an "or" relationship.

Research has found that after uploading texts, books, and the like to an artificial intelligence model for model learning, the model can learn the content features, but if the user sends a dialog question for the uploaded content, the answer results outputted by the artificial intelligence model often focus a little on the uploaded content, and focus more on large-scale samples used in model training, resulting in the problem of low accuracy and poor answer effect of the answer results outputted by the artificial intelligence model.

For example, a conventional artificial intelligence model supports the learning of text content and dialog with users based on the learned information, but the artificial intelligence model has been trained with a large number of training samples before use, even after learning the text content, answer results outputted by the model for the question information of the users may ignore the text content, and focus a lot on the information learned from the training samples, resulting in the problem of low accuracy of answer results and poor answer effect, which affects the effectiveness of the use of artificial intelligence models.

Based on the above research, the present disclosure provides a content generation method and apparatus based on multimedia content, a device and a medium. The multimedia content is subjected to content parsing, thereby determining multiple pieces of scattered content text information corresponding to the multimedia content. According to a text association degree between the content text information, the content text information is stored into a vector database in a vector data form, so that light-weight storage of each content text information can be realized by the vector data, the text association degree can be represented by an index relationship, and the correlation between the stored vector data is improved. After the question information for the multimedia content is received, target vector data having an association relationship with the question information can be quickly and conveniently found out from the vector database according to the index relationship. Finally, the target content text information corresponding to the target vector data and the question information are input into an artificial intelligence model, the target content text information can be summarized by the artificial intelligence model, and while an accurate answer result matched with the question information is outputted, it is guaranteed that the answer result and the multimedia content have high correlation, and thus the answer effect is guaranteed.

The defects of in the above solutions are all the results obtained by inventors after practice and careful research. Therefore, the discovery process of the above problems and the solutions proposed by the present disclosure for the above problems below are all be the contributions made by the inventors to the present disclosure in the process of the present disclosure.

It is be noted that similar numbers and letters represent similar items in the following accompanying drawings. Therefore, once an item is defined in one accompanying drawing, it does not need to be further defined and explained in subsequent accompanying drawings.

It is to be understood that before using the technical solutions disclosed in embodiments of the present disclosure, the type, scope of use, usage scenes, etc. of the personal information involved in the present disclosure should be informed to users and the authorization of the users should be obtained in an appropriate manner in accordance with relevant laws and regulations.

To facilitate understanding of this embodiment, the content generation method based on the multimedia content disclosed in this embodiment of the present disclosure is first introduced in detail. An execution subject of the content generation method based on the multimedia content provided in this embodiment of the present disclosure is generally a terminal device or other processing devices with certain computing capability, and the terminal device can be user equipment (UE), a mobile device, a user terminal, a terminal, a personal digital assistant (PDA), a handheld device, a computer device, etc. In some possible implementations, the content generation method based on the multimedia content can be implemented by a processor calling a computer-readable instruction stored in a memory.

The following takes a server serving as the execution subject as an example to illustrate the content generation method based on the multimedia content provided in this embodiment of the present disclosure.

FIG. 1 shows a flowchart of a content generation method based on a multimedia content according to an embodiment of the present disclosure, and the method may include the following steps:

S101: parsing a multimedia content, which is acquired, to obtain multiple pieces of content text information.

The multimedia content may be the content of any type, and may have any format, such as picture content in any picture format, video content in any video format, book content, and document content in any format.

The content text information can be text information parsed from the multimedia content, segmented and scattered content information can be among the content text information, and different text information may have different lengths and different semantics. The multiple pieces of content text information can realize the representation for the multimedia content, and the amount of the content text information can be determined according to the resource quantity and content repeatability of the multimedia content.

In specific implementation, an intelligent reading tool can be developed in advance, and the intelligent reading tool can be installed in any client. When the user stores a reading demand, the client can display a dialog page of the intelligent reading tool in response to the triggering operation of the user for the installed intelligent reading tool. Then, the user can upload the multimedia content to be read to the server by the client; and then the server can acquire the multimedia content uploaded by the client, and call a parsing function corresponding to a parsing plug-in to parse and extract the multimedia content, so as to obtain the multiple pieces of content text information.

It is to be noted that the content generation method based on the multimedia content provided by this embodiment of the present disclosure is applicable to multimedia content reading scenes; after the user uploads the multimedia content, the multimedia content can be parsed by the artificial intelligence model according to the content method based on the multimedia content provided by this embodiment of the present disclosure, and the parsed content text information can be stored in the vector database. Then, after receiving the question about the multimedia content from the user, the answer result based on the multimedia content can be generated through the target content text information found out based on the vector database.

In one embodiment, the multimedia content may include at least one selected from the groups of text content in any text format and video content in any video format. The text format may be, for example, PDF format, doc format, txt format, csv format, and xlsx format; and the video format may be, for example, mp4 format, AVI format, and MEPG format. In specific embodiments, any possible text format or video format may be within the protection range of the present disclosure.

For the above S101, the multimedia content can be acquired by at least one of the following two modes:

Mode 1: acquiring a local text content or a local video content uploaded by the client.

The local text content is text content in any text format stored locally at the client, and the local video content is a video content in any video format stored locally at the client.

Exemplarily, the server can acquire any local text content or any local video content uploaded by the client.

Mode 2: acquiring a text content or a video content from a storage location corresponding to an uploaded content link.

Herein, the content link may be an address link corresponding to any webpage, or may be a location link corresponding to any storage location.

Exemplarily, the server can acquire the content link uploaded by the client, and then acquire the multimedia content from the storage location indicated by the content link.

Optionally, because the acquired multimedia content may be the text content or video content, and may have any format, in order to improve the accuracy of the parsed content text information, different special parsing plug-ins can be set for text content in various text formats and video content in various video formats in advance. After the server acquires the multimedia content, the server can call the corresponding special parsing plug-in according to the format and type of the multimedia content (i.e., the text type or video type), and parse and extract the multimedia content by the corresponding parsing function of the special parsing plug-in, so as to obtain the multiple pieces of content text information.

Therefore, it is supported to upload the multimedia content in various formats in a variety of modes, which can improve the diversity of multimedia content that can be processed.

S102: storing the content text information into the vector database in the vector data form according to the text association degree between the content text information, vector data in the vector database having the index relationship related to the text association degree.

Herein, the text association degree represents the information association degree between two pieces of content text information, and the text association degree can exist between each content text information and other pieces of content text information. The text association degree can be determined according to the semantic features, continuity and relevance between two pieces of content text information. The continuity between the content text information represents whether a text formed by combining two pieces of content text information is continuous and smooth, and the relevance between the content text information represents the common degree of the text formed by combining two pieces of content text information. For example, for the content text information of "raining", "use umbrella" and "outing", the continuity and relevance between "raining" and "use umbrella" are superior to those between "raining" and "outing".

The vector database can store at least the vector data corresponding to each content text information.

Specifically, after each content text information is obtained, the vector data corresponding to each content text information can be generated, and then the vector data corresponding to each content text information can be stored in the vector database. Moreover, the index relationship between the vector data corresponding to each content text information can be established according to the text association degree between the content text information. For each vector data, there may be a corresponding index relationship, which can be determined by sorting the text association degree between the content text information corresponding to the vector data and other content text information in an order from high to low. Or, the index relationship can be established according to the text association degree between the content text information and a preset threshold. For example, when the text association degree between content text information 1 corresponding to vector data 1 and content text information 2 is greater than the preset threshold, an index relationship between the vector data 1 and the vector data 2 corresponding to the content text information 2 can be established. Conversely, when the text association degree between the content text information 1 and the content text information 2 is not greater than the preset threshold, there will be no index relationship between the vector data 1 and the vector data 2.

In specific implementation, after the content text information is parsed, the text association degree between every two pieces of content text information can be determined, and meanwhile vector data corresponding to each content text information can be generated. And then, each vector data can be stored in the pre-established vector database, and an index relationship between the vector data is established according to the text association degree between the content text information corresponding to each vector data. Therefore, by storing the vector data into the vector database, scattered storage of the multiple pieces of content text information corresponding to the multimedia content can be realized.

Optionally, the parsed text information of each content can be stored in the vector database or a pre-established text database.

S103: in response to receiving question information which is input, querying target vector data matching the question information from the vector database based on the index relationship between the vector data in the vector database.

The question information can be the question information sent by the user for the uploaded multimedia content, for example, the question information may be to ask the meaning of some word in the multimedia content, or ask the content architecture information of the multimedia content. The target vector data can be the vector data found out for answering the question information, and belongs to the vector data corresponding to the multimedia content uploaded by the user.

In specific implementations, after the content text information is stored in the vector database, the server can feed back the prompt information indicating the completion of the parsing to the client. For example, the prompt information can be "The content has been parsed, you can ask questions". Then, the client can display the prompt information on the dialog page. The user can initiate a questioning operation for the uploaded multimedia content, and input the question information in the dialog input box corresponding to the dialog page, and the client can transmit the question information to the server. The server can compute the matching degree between the question information and each vector data in response to receiving the question information, and find out each target vector data matching the question information from the vector database through the matching degree and the index relationship between the vector data. For example, when the vector data 1 is found out using the matching degree, vector data 3 and vector data 4 indicated by the index relationship of the vector data 1 can be used as the target vector data together.

In an embodiment, S103 can be implemented according to the following steps:

S103-1: generating at least one target query term corresponding to the question information according to the semantic features of the question information, different target query terms having different query semantics.

Herein, a target query term can be called as a query, which is obtained by semantic analysis on the question information, and different query semantics correspond to different query directions and query targets.

In a specific implementation, after the question information is acquired, semantic recognition and analysis can be performed on the question information to determine the semantic features of the question information. Then, according to the semantic features, each query semantics of the question information can be determined, and the target query term corresponding to each query semantics can be generated.

S103-2: according to each target query term and the index relationship between the vector data in the vector database, determining the target vector data matching the question information.

In a specific implementation, for each target query term, the target vector data matching each target query term can be determined according to the association degree between the target query term and the vector data in the vector database and the index relationship between the vector data. Then, the target vector data matching each target query term can be summarized to obtain each target vector data matching the question information.

Therefore, by semantic analysis on the question information, the question information can be abstracted into query, and the query can be used for finding out the target vector data from the vector database, which can improve the comprehensiveness and accuracy of the found vector data.

In an embodiment, after being obtained, the multiple pieces of content text information can be summarized. Specifically, the multiple pieces of content text information can be inputted into the artificial intelligence model to obtain the abstract report information corresponding to the multimedia content; and the abstract report information is transmitted to the client, and the client displays the abstract report information after receiving the abstract report information.

The abstract report information is the information summarized by the artificial intelligence model, which may include but be not limited to brief introduction of the content, text outline, text summary, text keywords, text key content, keyword occurrences, key content location, segment summary and other information.

In a specific implementation, after the multiple pieces of content text information are obtained, the artificial intelligence model can be called to input the multiple pieces of content text information into the artificial intelligence model, and the artificial intelligence model can identify and summarize the multiple pieces of content text information, so as to obtain the abstract report information of the multimedia content. For keywords, the words of specific types can be filtered, such as modal particle, and auxiliary words. Then, the server can transmit the abstract report information to the client, and the client can display the acquired abstract report information as the prompt information on the dialog page.

Figure 2:
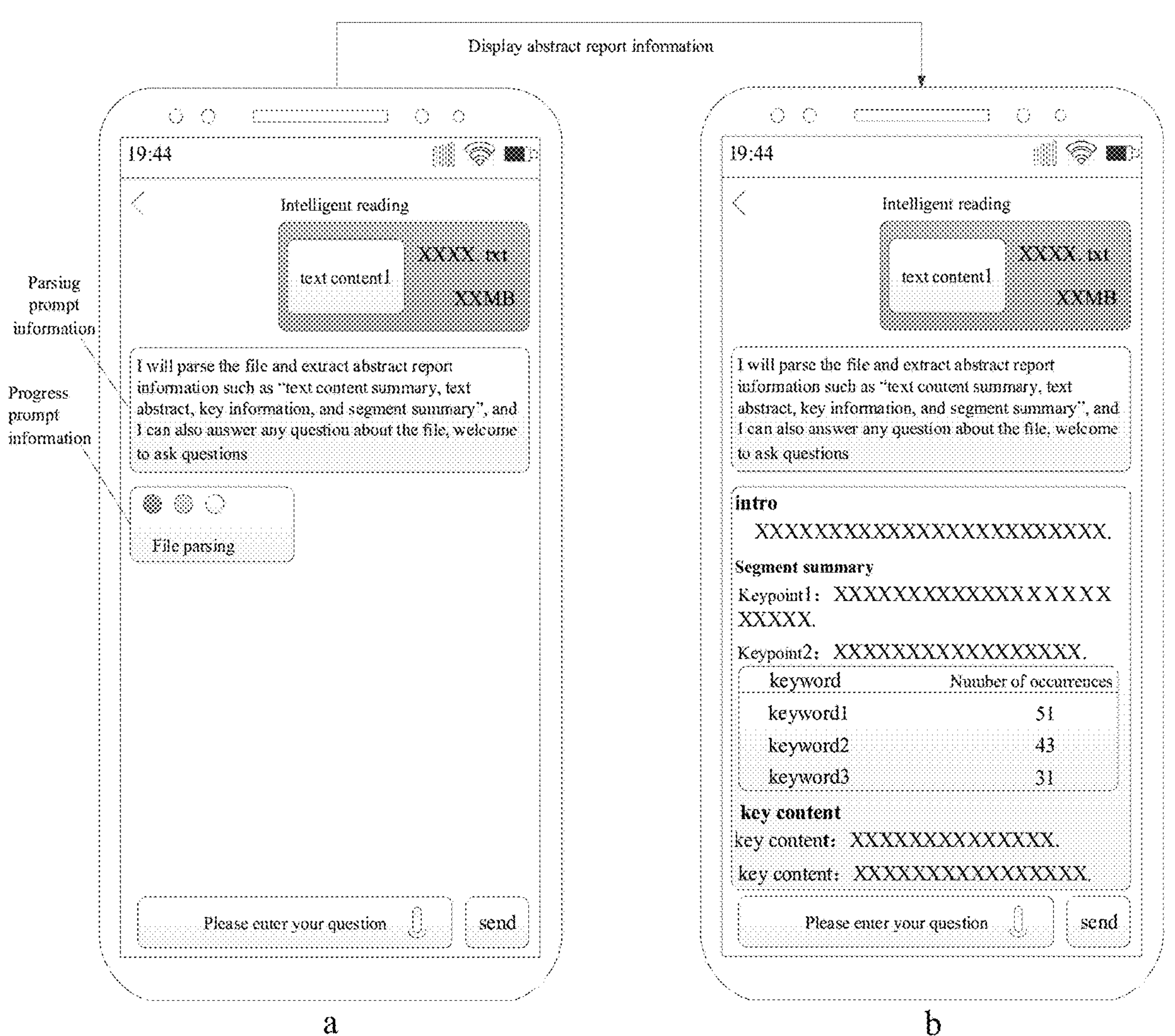
FIG. 2 shows a schematic diagram of one process of displaying abstract report information according to an embodiment of the present disclosure.

FIG. 2 shows a schematic diagram of one process of displaying abstract report information according to an embodiment of the present disclosure. As shown a in FIG. 2, the multimedia content displayed on the dialog page is text content 1 in the txt format; after the text content 1 is uploaded, the dialog page can display the parsing prompt information (that is, as shown a in FIG. 2, "I will parse the file and extract abstract report information such as "text content summary, text abstract, key information, and segment summary", and I can also answer any question about the file, welcome to ask questions"), and the progress prompt information (that is, "file parsing", as shown a in FIG. 2). After the server acquires the abstract report information using the artificial intelligence model, the abstract report information can be fed back to the client, the client will display the dialog page show as b in FIG. 2, and the abstract report information corresponding to the text content 1 is displayed in the dialog page, the abstract report information including profile, segment summary (e.g., a key point 1 and a key point 2), several keywords (keywords 1-3), corresponding occurrences and key contents (the key content 1 and 2 as shown b in FIG. 2). A dialog input box is also displayed in the dialog page, the dialog input box supports text input and voice input, and the user can ask questions about the content text 1 using the dialog input box.

In addition, the text content detail page corresponding to the text content 1 can be displayed in response to the triggering operation for the text content 1 in the dialog page, so that the display of a source text can be realized.

In an embodiment, when the multimedia content is the video content, the content text information may include the image text information corresponding to each frame of video frame image. That is, when the multimedia content is the video content, each frame of video frame image in the video content can be identified to obtain the image text information corresponding to each video frame image, and the image text information can be used as the content text information corresponding to the video content.

The step of generating the abstract report information can be implemented as follows:

Step 1: inputting each image text information into the artificial intelligence model to obtain key frame information of the video content, keyword information and video content summary information.

The key frame information indicates each key frame picture in the video content, specifically, it can be part of the image text information in the inputted image text information. The keyword information indicates each keyword of the video content; the video content summary information may include brief introduction of the video content, video segment summary, mainstream summary of the video content, the point of the video, and so on.

In a specific implementation, when the multimedia content is the video content, the video content can be parsed first to obtain the image text information corresponding to each frame of video frame image in the video content. Then, the artificial intelligence model can be called and the image text information can be inputted to the artificial intelligence model, and the artificial intelligence model can be used for identifying and summarizing the image text information, thereby obtaining the key frame information corresponding to the video content, the keyword information and the video content summary information. When extracting the key keywords, the words of specific types can be filtered, such as common modal particle, auxiliary words, prepositions, and position words.

Step 2: determining each key frame image corresponding to the video content according to the key frame information.

In a specific implementation, the artificial intelligence model can be used for generating the key frame image matching each key frame information according to the key frame information. Or, the artificial intelligence model can call the picture query function to find out the key frame image corresponding to each key frame information from the video content.

Step 3: generating abstract report information corresponding to the video content according to the key frame image, the keyword information and the video content summary information.

In a specific implementation, the key frame image, the keyword information and the video content summary information can be structured and combined to obtain the abstract report information corresponding to the video content.

Optionally, after acquiring the video content uploaded by the user, the key frame image can be extracted from the video content using the corresponding key frame extraction function of the video analysis plug-in. Then, after the image text information is inputted into the artificial intelligence model, the keyword information and the video content summary information of the video content can be obtained. The abstract report information can be generated according to the keyword information, the video content summary information, and the key frame image extracted through the key frame extraction function. The following modes can be utilized: extracting the key frame image can be, and performing difference processing on every two frames of video frame images in the video content, so as to obtain the average pixel intensity between the two frames of images. The average pixel intensity can be used for measuring the degree of change of the picture content of the two frames of video frame images. Then, the two frames of video frame images with average pixel intensity greater than the preset intensity can be used as the extracted key frame images. Therefore, the video frame images with a large degree of change in picture content can be extracted.

Figure 3:
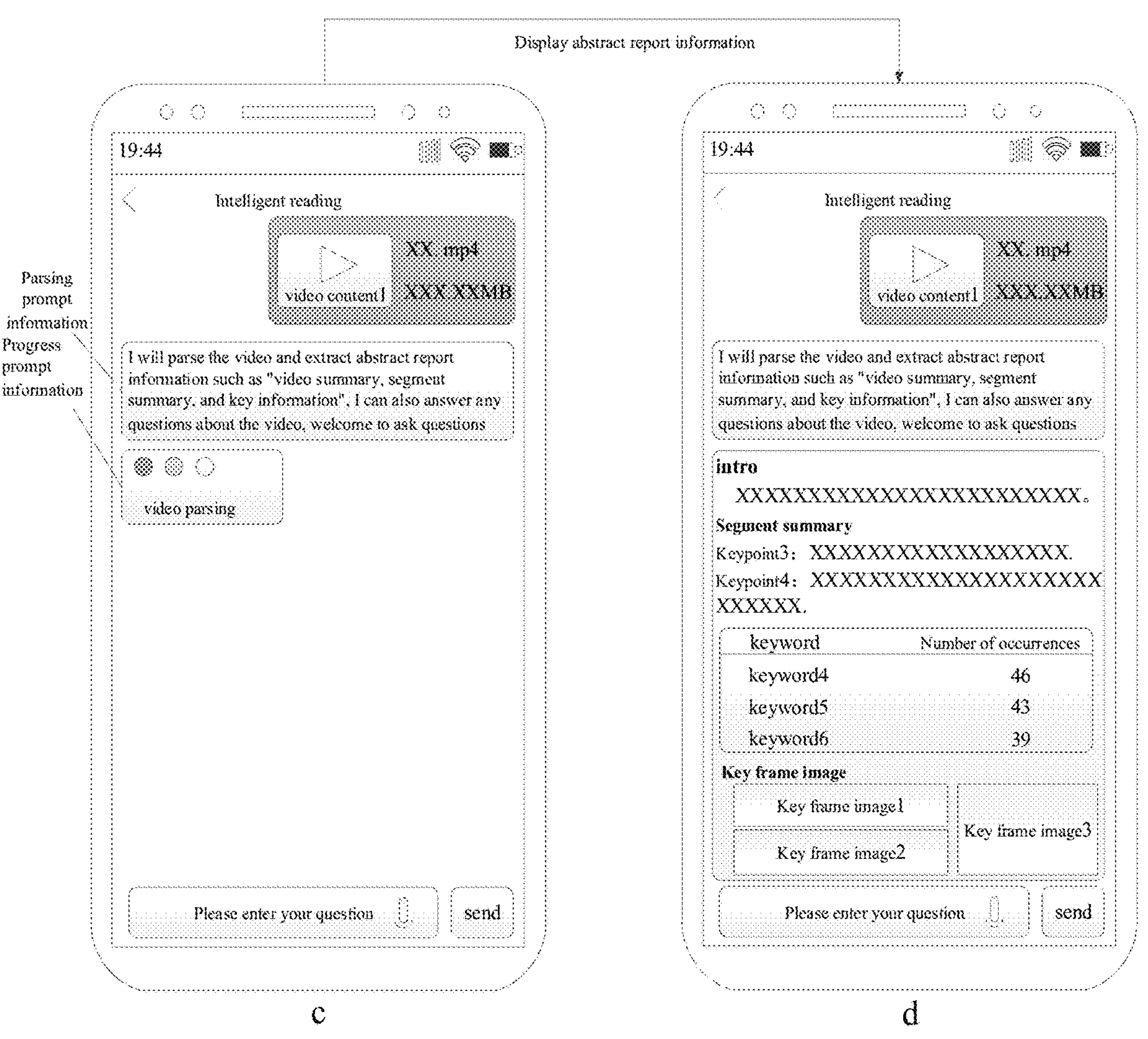
FIG. 3 shows a schematic diagram of another process of displaying abstract report information according to an embodiment of the present disclosure.

FIG. 3 shows a schematic diagram of another process of displaying abstract report information according to an embodiment of the present disclosure. As shown c in FIG. 3, the multimedia content displayed on the dialog page is the video content 1 in the mp4 format; after the video content 1 is uploaded, the dialog page can display the parsing prompt information (that is, as shown c in FIG. 3, "I will parse the video and extract abstract report information such as "video summary, segment summary, and key information", I can also answer any questions about the video, welcome to ask questions"), and the parsing progress prompt information (that is, "video parsing", as shown c in FIG. 3). After the server acquires the abstract report information using the artificial intelligence model, the abstract report information can be fed back to the client, the client will display the dialog page as shown d in FIG. 3, and the abstract report information corresponding to the video content 1 is displayed on the dialog page, the abstract report information including brief introduction, segment summary (a key point 3 and a key point 4), multiple keywords (keywords 4-6), and corresponding occurrences and keyword frame images (keyword frame images 1-3). The dialog input box is also displayed in the dialog page, the dialog input box supports text input and voice input, and the user can ask questions about the video content 1 using the dialog input box.

In addition, the video content detail page corresponding to the video content 1 can be displayed in response to the triggering operation for the video content 1 in the dialog page, and thus the display of the source video can be realized. Moreover, when displaying the source video, a hidden play control in the page can be triggered to enter an immersion state, thus realizing hidden playing of the source video.

S104: inputting the target content text information corresponding to the target vector data and the question information into the artificial intelligence model to obtain an answer result associated with the multimedia content.

Herein, the answer result is a result for answering the question information, and the result is summarized by the artificial intelligence model. The answer result is generated based on the target content text information corresponding to the target vector data, so that the answer result has strong correlation with the multimedia content uploaded by the user. The target content text information is the content text information used for generating the target vector data.

In a specific implementation, after each piece of target vector data is determined, the target content text information corresponding to each target vector data can be found. If the target content text information is stored in the vector database, each target content text information can be directly queried in the vector database; and if the target content text information is stored in the text database, each target content text information can be queried from the text database. For each target vector data, location information of the target content text information corresponding to the target vector data can be carried, and the target content text information corresponding to the target vector data can be directly obtained from the carried storage location.

After each target content text information is obtained, the artificial intelligence model can be called, and the question information and each target content text information can be inputted to the artificial intelligence model; and the artificial intelligence model identifies the question information, summarizes each target content text information, and outputs the answer result associated with the multimedia content, and the answer result is used for answering the question information.

In an embodiment, in order to further improve the accuracy and rationality of the generated answer result, the above S104 can also be implemented according to the following steps:

inputting the target content text information and the question information into the artificial intelligence model, and generating the answer result associated with the multimedia content through the artificial intelligence model according to corresponding content generation rule information.

The content generation rule information can be the rule information preset for the artificial intelligence model in the reading scene corresponding to the intelligent reading tool, and the rule information is used for assisting the artificial intelligence model in generating the answer result. For example, the content generation rule information may include generation topic information and generation constraint information; the generation topic information can be specifically a topic that tends to generate content based on the multimedia content, and the generation constraint information may include format constraint, word number constraint, content architecture constraint, symbol use constraint and the like of the answer result.

In a specific implementation, after the question information is received, the content generation rule information matching the scene (i.e., the reading scene) corresponding to the question information can be determined. Then, the target content text information, the content generation rule information and the question information can be inputted into the artificial intelligence model together, and the content generation rule information is used for performing generation constraint on the artificial intelligence model, so as to obtain the answer result for answering the question information. The answer result here not only has strong correlation with the multimedia content corresponding to the target content text information, but also conforms to the generation rule indicated by the content generation rule information, so that the question demand of the user can be better satisfied, and the answer accuracy is improved.

In another embodiment, in order to improve the conversation relevance, when there is a historical conversation for the same multimedia content before the current round of dialog, the above S104 can also be implemented according to the following steps:

S104-1: acquiring each round of historical dialog information with dialog time before question time of the question information, the historical dialog information being dialog information for the multimedia content.

Herein, one question information and one answer result for the question information can be called as a round of dialog information; the historical dialog information can be each round of dialog information generated before the dialog information corresponding to the current round of dialog is carried out, and the historical dialog information and the current round of dialog information are both the dialog information for the multimedia content uploaded by the user.

The question time is the input time of the question information in the current round of dialog, and the dialog time can be the input time of the historical question information in each round of historical dialog information.

In a specific implementation, after the question information for the multimedia content is acquired, whether there is the historical dialog information for the multimedia content can be determined according to the question time of the question information and the dialog time corresponding to the historical dialog information. If so, each round of historical dialog information with the dialog time before the question time of the question information can be acquired, and the following S104-2 is executed. If not so, the target content text information, the content generation rule information and the question information can be directly inputted into the artificial intelligence model together to obtain the answer result.

S104-2: inputting each round of historical dialog information, the target content text information and the question information into the artificial intelligence model to obtain the answer result associated with the multimedia content.

In a specific implementation, after each round of historical dialog information for the multimedia content is acquired, each round of historical dialog information, the target content text information and the question information can be inputted into the artificial intelligence model together, so that the generated answer result is intervened by the historical dialog information, and the answer result associated with the multimedia content is obtained; and the obtained answer result has strong correlation with the historical dialog information and the target content text information.

Optionally, after each round of historical dialog information for multimedia content is obtained, each round of historical dialog information, target content text information, question information and content generation rule information can be inputted into the artificial intelligence model together, so as to obtain an answer result associated with the multimedia content. In this way, not only the content constraint for the generated answer result can be realized, but also the correlation of the generated answer result to the historical dialog information and the multimedia content can be provided, and thus the dialog effect can be improved.

Figure 4:
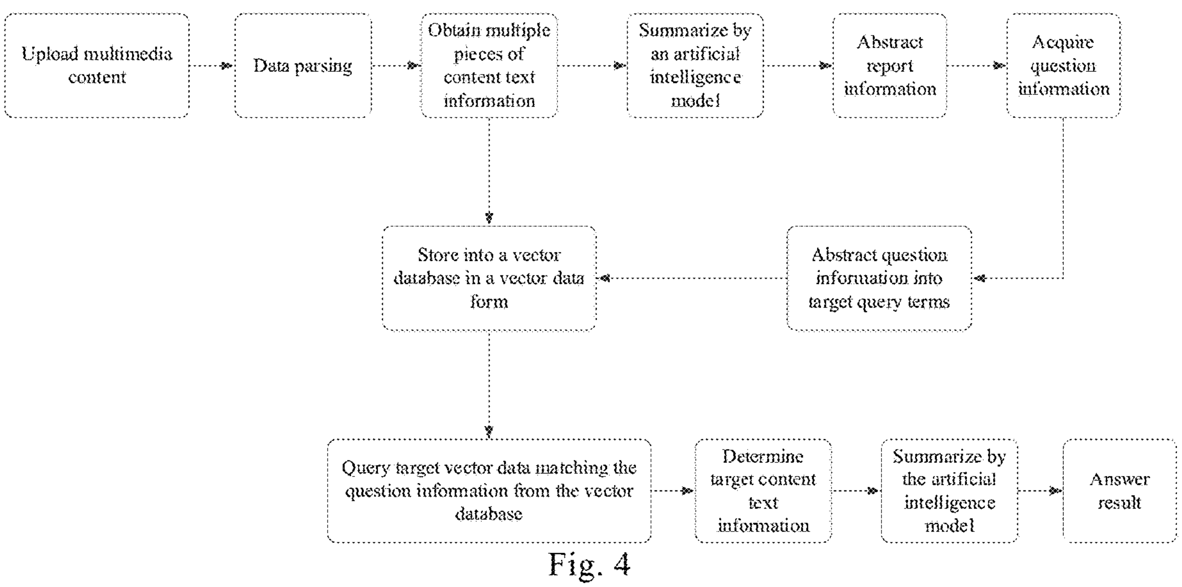
FIG. 4 shows a schematic diagram of a process of generating an answer result according to an embodiment of the present disclosure.

FIG. 4 shows a schematic diagram of a process of generating an answer result according to an embodiment of the present disclosure; the server can receive the multimedia content uploaded by the client, and the multimedia content can be the content of any format, such as excel content, ppt content, pdf content, and mp4 content. Then, the server can parse the data to obtain the multiple pieces of content text information corresponding to the multimedia content. The content text information is stored into vector database in the vector data forma. Moreover, the multiple pieces of content text information can be inputted to the artificial intelligence model, and the artificial intelligence model performs summarizing to obtain the abstract report information corresponding to the multimedia content. The abstract report information is fed back to the client, and then the client can display the abstract report information on the dialog page. Then, the user can ask questions about the multimedia content on the dialog page of the client, and the client can acquire the question information inputted by the user and transmit the question information to the server. The server can convert the question information into the target query terms, and determine the target vector data corresponding to the target query terms according to the index relationship between the vector data in the vector database. Thus, the target vector data matching the question information can be found out from the vector database. Then, the target content text information corresponding to each target vector data can be determined, the target content text information and the question information can be inputted to the artificial intelligence model, and the artificial intelligence model performs summarizing to obtain the answer result associated with the multimedia content. Optionally, the target content text information, the question information, the historical dialog information and the content generation rule information can also be inputted to the artificial intelligence model together to obtain the answer result associated with the multimedia content. Finally, the server can feed back the abstract result to the client, so that the client can display the answer result to the user, thereby completing one round of dialog. Each implementation process of each step in FIG. 4 can be referred to the above-mentioned embodiment, repetition will not be repeated herein again.

Those skilled in the art may understood that in the above method of the specific implementation modes, the order in which the steps are written does not imply a strict execution order and does not constitute any limitation on the implementation process, and the specific execution order of the steps should be determined by their functions and possible internal logic.

Based on the same inventive concept, an embodiment of the present disclosure also provides a content generation apparatus based on a multimedia content corresponding to the content generation method based on the multimedia content. As that principle of the apparatus in this embodiment of the present disclosure for solving the problem is similar to the content generation method based on the multimedia content according to the embodiment of the present disclosure, the implementation of the apparatus can refer to the implementation of the method, repetition will not be repeated herein again.

Figure 5:
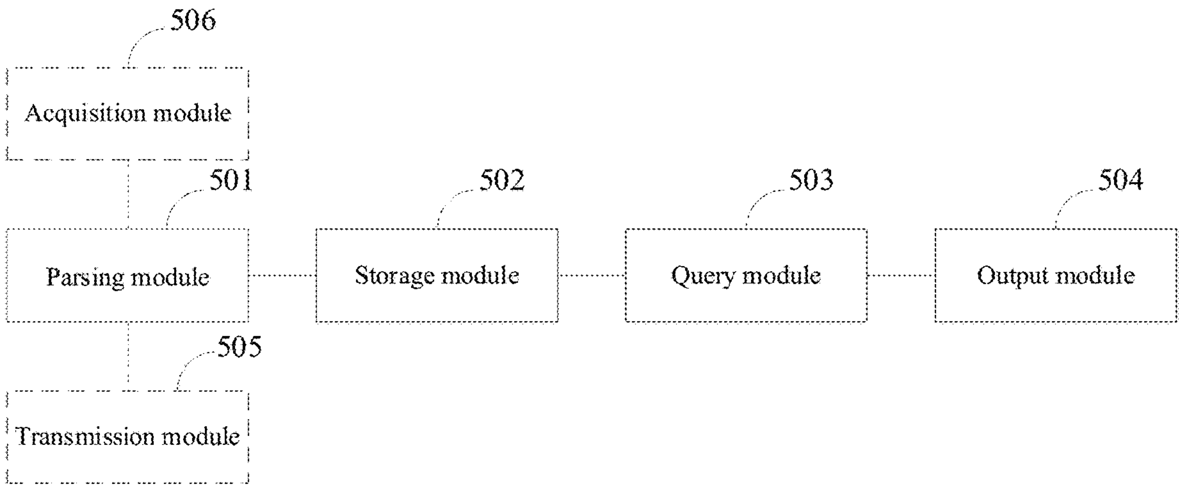
FIG. 5 shows a schematic diagram of a content generation apparatus based on a multimedia content according to an embodiment of the present disclosure.

FIG. 5 shows a schematic diagram of a content generation apparatus based on multimedia content according to an embodiment of the present disclosure, and the apparatus includes:

a parsing module 501 which is configured to parse a multimedia content, which is acquired, to obtain multiple pieces of content text information;

a storage module 502 which is configured to store the content text information into a vector database in a vector data form according to a text association degree between the content text information, vector data in the vector database having an index relationship related to the text association degree;

a query module 503 which is configured to in response to receiving question information which is input, query target vector data matching the question information from the vector database based on the index relationship between the vector data in the vector database; and an output module 504 which is configured to input target content text information corresponding to the target vector data and the question information into an artificial intelligence model to obtain an answer result associated with the multimedia content.

In a possible implementation mode, the apparatus further includes:

a transmission module 505 which is configured to: after the multiple pieces of content text information are obtained, input the multiple pieces of content text information into the artificial intelligence model to obtain abstract report information corresponding to the multimedia content; and transmit the abstract report information to a client, the client being configured to display the abstract report information after receiving the abstract report information.

In a possible implementation mode, when querying target vector data matching the question information from the vector database based on the index relationship between the vector data in the vector database, the query module 503 is configured to:

generate at least one target query term corresponding to the question information according to semantic features of the question information, different target query terms having different search semantics; and determine each the target vector data matching the question information according to each target query term and the index relationship between the vector data in the vector database.

In a possible implementation mode, when inputting target content text information corresponding to the target vector data and the question information into an artificial intelligence model to obtain an answer result associated with the multimedia content, the output module 504 is configured to:

input the target content text information and the question information into the artificial intelligence model, and generate the answer result associated with the multimedia content through the artificial intelligence model according to corresponding content generation rule information.

In a possible implementation mode, when inputting target content text information corresponding to the target vector data and the question information into an artificial intelligence model to obtain an answer result associated with the multimedia content, the output module 504 is configured to:

acquire each round of historical dialog information with dialog time before question time of the question information, the historical dialog information being dialog information for the multimedia content; and input each round of historical dialog information, the target content text information and the question information into the artificial intelligence model to obtain the answer result associated with the multimedia content.

In a possible implementation mode, the multimedia content includes at least one selected from the groups of text content in any text format and video content in any video format;

the apparatus further includes an acquisition module 506 which is configured to acquire the multimedia content through at least one of the following modes:

acquiring local text content or local video content uploaded by a client, and acquiring the text content or the video content from a storage location corresponding to an uploaded content link.

In a possible implementation mode, when the multimedia content includes the video content, the content text information includes image text information corresponding to each frame of video frame image;

when inputting the multiple pieces of content text information into the artificial intelligence model to obtain abstract report information corresponding to the multimedia content, the transmission module 505 is configured to:

input each image text information into the artificial intelligence model to obtain key frame information of the video content, keyword information and video content summary information;

determine each key frame image corresponding to the video content according to the key frame information; and generate the abstract report information corresponding to the video content according to the key frame image, the keyword information and the video content summary information.

The description of the processing flow of each module in the apparatus and the interaction flow between the modules may refer to the relevant instructions in the above method embodiments, repetition will not be repeated herein again.

Figure 6:
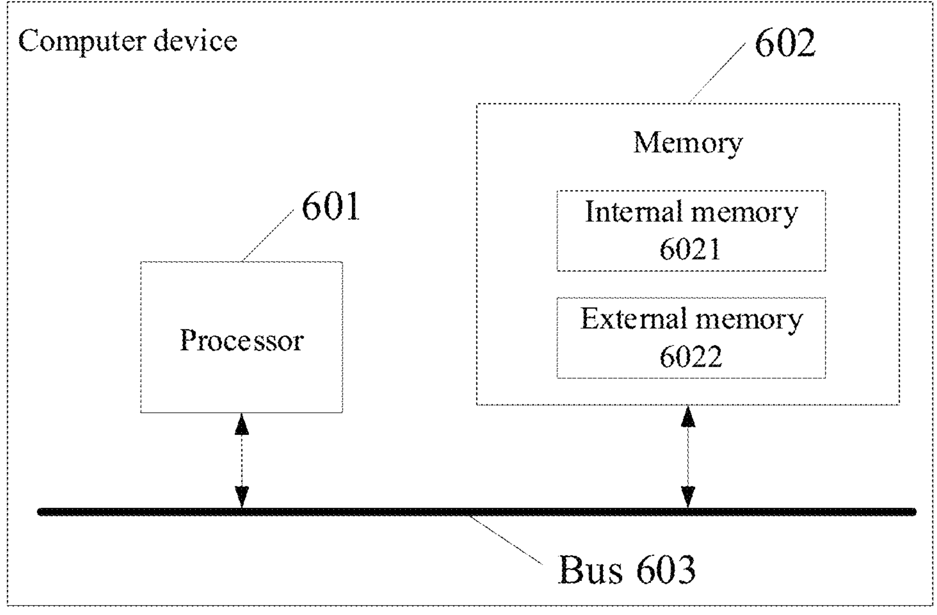
FIG. 6 shows a structural schematic diagram of a computer device according to an embodiment of the present disclosure.

Based on the same technical concept, an embodiment of the present application also provides a computer device. FIG. 6 shows a structural schematic diagram of a computer device according to an embodiment of the present disclosure, and the computer device includes:

a processor 601, a memory 602 and a bus 603. The memory 602 stores a machine-readable instruction executable by the processor 601; the processor 601 is configured to execute the machine-readable instruction stored in the memory 602; and when the machine-readable instruction is executed by the processor 601, the processor 601 executes the following steps: S101: parsing a multimedia content, which is acquired, to obtain multiple pieces of content text information; S102: storing the content text information into a vector database in a vector data form according to a text association degree between the content text information, vector data in the vector database having an index relationship related to the text association degree; S103: in response to receiving question information which is input, querying target vector data matching the question information from the vector database based on the index relationship between the vector data in the vector database; and S104: inputting target content text information corresponding to the target vector data and the question information into an artificial intelligence model to obtain an answer result associated with the multimedia content.

The memory 602 includes an internal memory 6021 and an external memory 6022; the internal memory 6021 is also called an internal storage and is configured to temporarily store operation data in the processor 601, and the data exchanged with the external memory 6022 such as a hard disk; the processor 601 exchanges data with the external memory 6022 through the internal memory 6021; and when the computer device runs, the processor 601 communicates with the memory 602 through the bus 603, so that the processor 601 executes the execution instructions mentioned in the method embodiments.

An embodiment of the present disclosure further provides a computer-readable storage medium which stores computer programs; and the computer programs are operated by the computer device to execute the steps of the content generation method based on the multimedia content according to the method embodiments. The storage medium can be a volatile or non-volatile computer readable storage medium.

A computer program product of the content generation method based on the multimedia content provided by the embodiment of the present disclosure includes a computer-readable storage medium storing program codes, and instructions included in the program codes can be used for executing the steps of the content generation method based on the multimedia content in the method embodiments, specifically referring to the method embodiments, repetition will not be repeated herein again.

The computer program product can be specifically implemented through hardware, software or a combination thereof. In one optional embodiment, the computer program product is specifically embodied as a computer storage medium; and in another optional embodiment, the computer program product is specifically embodied as a software product, such as a Software Development Kit (SDK).

Those skilled in the art can clearly understand that, for the convenience and simplicity of description, the specific working process of the system and apparatus described above can refer to the corresponding process in the method embodiments, and will not be listed here. In the several embodiments provided in the present disclosure, it is to be understood that the disclosed system, apparatus and method can be implemented by other modes. The apparatus embodiments described above are merely schematic. For example, the division of units is only a logical function division, and there may be other division modes in actual implementation. For another example, multiple units or components can be combined or integrated into another system, or some features can be ignored or not executed. Another point is that the mutual coupling or direct coupling or communication connection shown or discussed can be through some communication interfaces, and the indirect coupling or communication connection of the apparatus or units can be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the purpose of the solution of this embodiment.

In addition, all functional units in the various embodiments of the present disclosure may be integrated into one processing unit, or each unit may exist physically separately, or two or more units may be integrated into one unit.

If the function is realized in a form of software function unit and is sold or used as an independent product, the function can be stored in a non-volatile computer-readable storage medium which is executable by the processor. Based on this understanding, the technical solution of the present disclosure, in essence, or the part that contributes to the prior art, or the part of the technical solution, can be embodied in the form of software product. The computer software product is stored in the storage medium and includes multiple instructions used for enabling a computer device (which can be a personal computer, a server or a network device and the like) to execute all or part of the steps of the method in each embodiment of the present disclosure. The storage medium includes a USB flash disk, a mobile hard disk, a Read-Only Memory (ROM), a Random Access Memory (RAM), a disk or an optical disk and other media capable of storing the program codes.

If the technical solution of this application involves personal information, the personal information processing rules are to be clearly informed and the personal independent permission is to be gained before processing personal information by the product in the technical solution of this application. If the technical solution of this application involves sensitive personal information, individual permission is to be gained and the requirement of "explicit consent" is met before processing sensitive personal information by the product in the technical solution of this application. For example, at the location of a personal information collection apparatus such as a camera, clear and prominent signs are set up to inform that the personal information collection range is entered, and personal information will be collected. If individuals voluntarily enter the collection range, it is considered that they agrees to collect their personal information; or, on personal information processing apparatuses, by using clear identification/information to inform the personal information processing rule, personal authorization is obtained through pop-up messages or by asking individuals to upload their personal information on their own; and the personal information processing rule may include personal information processors, personal information processing purposes, processing modes, types of personal information processed, and other information.

Finally, it is to be noted that the abovementioned embodiments are only specific implementation modes of the present disclosure, which are used for illustrating the technical solutions of the present disclosure, rather than to limit them. The protection scope of the present disclosure is not limited thereto. Although the present disclosure is described in detail with reference to the abovementioned embodiments, ordinary technicians in the field should understand that any technician familiar with the technical field can still modify the technical solutions recorded in the abovementioned embodiments within the technical scope disclosed in the present disclosure, or can easily think of changes, or make equivalent replacements for some of the technical features therein; and these modifications, changes or replacements do not make the essence of the corresponding technical solutions deviate from the spirit and scope of the technical solutions of the embodiments of the present disclosure, and should be included in the protection scope of the present disclosure. Therefore, the protection scope of the present disclosure should be based on the protection scope of the claims.

The invention claimed is:

1. A content generation method based on a multimedia content, comprising:

in response to a user uploading a multimedia content to a server, parsing the multimedia content to obtain multiple pieces of content text information by calling a parsing plug-in corresponding to a type of the multimedia content, wherein the type of the multimedia content comprises a document type or a video type;

storing the content text information into a vector database in a vector data form according to a text association degree between the content text information, wherein vector data in the vector database have an index relationship related to the text association degree;

in response to receiving question information associated with the multimedia content, querying vector data matching the question information from the vector database, wherein the vector data matching the question information comprises a first vector data;

determining additional vector data that does not match the question information but that is linked to the first vector data through the index relationship in the vector database, wherein the additional vector data comprises a second vector data; and inputting a subset of the content text information and the question information into an artificial intelligence model to obtain an answer result associated with the multimedia content, the subset of the context text information corresponding to the first vector data and the second vector data.

2. The method according to claim 1, wherein after obtaining the multiple pieces of content text information, the method further comprises:

inputting the multiple pieces of content text information into the artificial intelligence model to obtain abstract report information corresponding to the multimedia content; and transmitting the abstract report information to a client, wherein the client is configured to display the abstract report information after receiving the abstract report information.

3. The method according to claim 1, wherein the querying the vector data matching the question information from the vector database comprises:

generating at least one target query term corresponding to the question information according to semantic features of the question information, wherein different target query terms have different search semantics; and determining the vector data matching the question information according to each target query term and the index relationship between the vector data in the vector database.

4. The method according to claim 1, wherein the inputting the subset of the content text information and the question information into the artificial intelligence model to obtain the answer result associated with the multimedia content comprises:

inputting the subset of the content text information and the question information into the artificial intelligence model, and generating the answer result associated with the multimedia content through the artificial intelligence model according to corresponding content generation rule information.

5. The method according to claim 1, wherein the inputting the subset of the content text information and the question information into the artificial intelligence model to obtain the answer result associated with the multimedia content comprises:

acquiring each round of historical dialog information with dialog time before question time of the question information, wherein the historical dialog information is dialog information for the multimedia content; and inputting each round of historical dialog information, the the subset of the content text information and the question information into the artificial intelligence model to obtain the answer result associated with the multimedia content.

6. The method according to claim 1, wherein the multimedia content comprises at least one selected from a group consisting of text content in any text format and video content in any video format;

the multimedia content is acquired by at least one of the following modes:

acquiring local text content or local video content uploaded by a client, and acquiring the text content or the video content from a storage location corresponding to an uploaded content link.

7. The method according to claim 2, wherein the multimedia content comprises video content, the content text information comprises image text information corresponding to each frame of video frame image; and the inputting the multiple pieces of content text information into the artificial intelligence model to obtain abstract report information corresponding to the multimedia content comprises:

inputting each piece of image text information into the artificial intelligence model to obtain key frame information of the video content, keyword information and video content summary information;

determining each key frame image corresponding to the video content according to the key frame information; and generating the abstract report information corresponding to the video content according to the key frame image, the keyword information and the video content summary information.

8. A computer device, comprising: a processor and a memory, wherein the memory stores computer-readable instructions executable by the processor; the processor is configured to execute the computer-readable instructions stored in the memory; and when the computer-readable instructions are executed by the processor, the processor executes a content generation method based on a multimedia content, which comprises:

in response to a user uploading a multimedia content to a server, parsing the multimedia content to obtain multiple pieces of content text information by calling a parsing plug-in corresponding to a type of the multimedia content, wherein the type of the multimedia content comprises a document type or a video type;

storing the content text information into a vector database in a vector data form according to a text association degree between the content text information, wherein vector data in the vector database have an index relationship related to the text association degree;

in response to receiving question information associated with the multimedia content, querying vector data matching the question information from the vector database, wherein the vector data matching the question information comprises a first vector data;

determining additional vector data that does not match the question information but that is linked to the first vector data through the index relationship in the vector database, wherein the additional vector data comprises a second vector data; and inputting a subset of the content text information and the question information into an artificial intelligence model to obtain an answer result associated with the multimedia content, the subset of the context text information corresponding to the first vector data and the second vector data.

9. The computer device according to claim 8, wherein after obtaining the multiple pieces of content text information, the method further comprises:

inputting the multiple pieces of content text information into the artificial intelligence model to obtain abstract report information corresponding to the multimedia content; and transmitting the abstract report information to a client, wherein the client is configured to display the abstract report information after receiving the abstract report information.

10. The computer device according to claim 8, wherein the querying target the vector data matching the question information from the vector database comprises:

generating at least one target query term corresponding to the question information according to semantic features of the question information, wherein different target query terms have different search semantics; and determining the vector data matching the question information according to each target query term and the index relationship between the vector data in the vector database.

11. The computer device according to claim 8, wherein the inputting the subset of the content text information and the question information into the artificial intelligence model to obtain the answer result associated with the multimedia content comprises:

inputting the subset of the content text information and the question information into the artificial intelligence model, and generating the answer result associated with the multimedia content through the artificial intelligence model according to corresponding content generation rule information.

12. The computer device according to claim 8, wherein the inputting the subset of the content text information and the question information into the artificial intelligence model to obtain the answer result associated with the multimedia content comprises:

acquiring each round of historical dialog information with dialog time before question time of the question information, wherein the historical dialog information is dialog information for the multimedia content; and inputting each round of historical dialog information, the the subset of the content text information and the question information into the artificial intelligence model to obtain the answer result associated with the multimedia content.

13. The computer device according to claim 8, wherein the multimedia content comprises at least one selected from the groups of text content in any text format and video content in any video format;

the multimedia content is acquired by at least one of the following modes:

acquiring local text content or local video content uploaded by a client, and acquiring the text content or the video content from a storage location corresponding to an uploaded content link.

14. The computer device according to claim 9, wherein upon the multimedia content comprises video content, the content text information comprises image text information corresponding to each frame of video frame image; and the inputting the multiple pieces of content text information into the artificial intelligence model to obtain abstract report information corresponding to the multimedia content comprises:

inputting each piece of image text information into the artificial intelligence model to obtain key frame information of the video content, keyword information and video content summary information;

determining each key frame image corresponding to the video content according to the key frame information; and generating the abstract report information corresponding to the video content according to the key frame image, the keyword information and the video content summary information.

15. A non-transient computer-readable storage medium, storing computer programs, wherein when the computer programs are operated by a computer device, the computer device executes a content generation method based on a multimedia content, which comprises:

in response to a user uploading a multimedia content to a server, parsing the multimedia content to obtain multiple pieces of content text information by calling a parsing plug-in corresponding to a type of the multimedia content, wherein the type of the multimedia content comprises a document type or a video type;

storing the content text information into a vector database in a vector data form according to a text association degree between the content text information, wherein vector data in the vector database have an index relationship related to the text association degree;

in response to receiving question information associated with the multimedia content, querying vector data matching the question information from the vector database, wherein the vector data matching the question information comprises a first vector data;

determining additional vector data that does not match the question information but that is linked to the first vector data through the index relationship in the vector database, wherein the additional vector data comprises a second vector data; and inputting a subset of the content text information and the question information into an artificial intelligence model to obtain an answer result associated with the multimedia content, the subset of the context text information corresponding to the first vector data and the second vector data.

16. The storage medium according to claim 15, wherein after obtaining the multiple pieces of content text information, the method further comprises:

inputting the multiple pieces of content text information into the artificial intelligence model to obtain abstract report information corresponding to the multimedia content; and transmitting the abstract report information to a client, wherein the client is configured to display the abstract report information after receiving the abstract report information.

17. The storage medium according to claim 15, wherein the querying target the vector data matching the question information from the vector database comprises:

generating at least one query term corresponding to the question information according to semantic features of the question information, wherein different target query terms have different search semantics; and determining the target vector data matching the question information according to each target query term and the index relationship between the vector data in the vector database.

18. The storage medium according to claim 15, wherein the inputting the subset of the content text information and the question information into the artificial intelligence model to obtain the answer result associated with the multimedia content comprises:

inputting the subset of the content text information and the question information into the artificial intelligence model, and generating the answer result associated with the multimedia content through the artificial intelligence model according to corresponding content generation rule information.

19. The storage medium according to claim 15, wherein the inputting the subset of the content text information and the question information into the artificial intelligence model to obtain the answer result associated with the multimedia content comprises:

acquiring each round of historical dialog information with dialog time before question time of the question information, wherein the historical dialog information is dialog information for the multimedia content; and inputting each round of historical dialog information, the the subset of the content text information and the question information into the artificial intelligence model to obtain the answer result associated with the multimedia content.

20. The storage medium according to claim 15, wherein the multimedia content comprises at least one selected from the groups of text content in any text format and video content in any video format;

the multimedia content is acquired by at least one of the following modes:

acquiring local text content or local video content uploaded by a client, and acquiring the text content or the video content from a storage location corresponding to an uploaded content link.

* * * * *